United States Patent
Zhao et al.

(10) Patent No.: US 10,576,738 B2
(45) Date of Patent: Mar. 3, 2020

(54) CALIBRATION METHOD AND CALIBRATION DEVICE FOR VOLUME OF INK DROPLET, PRINTING APPARATUS

(71) Applicant: BOE TECHNOLOGY GROUP CO., LTD., Beijing (CN)

(72) Inventors: Dejiang Zhao, Beijing (CN); Hao Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/520,564

(22) PCT Filed: Sep. 6, 2016

(86) PCT No.: PCT/CN2016/098155
§ 371 (c)(1),
(2) Date: Apr. 20, 2017

(87) PCT Pub. No.: WO2017/121132
PCT Pub. Date: Jul. 20, 2017

(65) Prior Publication Data
US 2018/0104949 A1    Apr. 19, 2018

(30) Foreign Application Priority Data

Jan. 15, 2016 (CN) .......................... 2016 1 0029198

(51) Int. Cl.
*B41J 2/01* (2006.01)
*B41J 2/045* (2006.01)
(Continued)

(52) U.S. Cl.
CPC ......... *B41J 2/04535* (2013.01); *B41J 2/0456* (2013.01); *B41J 2/04586* (2013.01); *G01F 22/00* (2013.01); *G01F 25/0092* (2013.01)

(58) Field of Classification Search
USPC ...................................................... 347/19, 5
See application file for complete search history.

(56) References Cited

U.S. PATENT DOCUMENTS

6,431,679 B1    8/2002 Li et al.
2005/0122363 A1    6/2005 Koyama
(Continued)

FOREIGN PATENT DOCUMENTS

CN    1607378 A    4/2005
CN    1780737 A    5/2006
(Continued)

OTHER PUBLICATIONS

International Search Report dated Dec. 8, 2016 issued in corresponding International Application No. PCT/CN2016/098155.
(Continued)

*Primary Examiner* — Lam S Nguyen
(74) *Attorney, Agent, or Firm* — Nath, Goldberg & Meyer; Joshua B. Goldberg; Daniel Bissing

(57) ABSTRACT

The present disclosure provides a calibration method and a calibration device for a volume of an ink droplet and a printing apparatus including the calibration device. The calibration method for a volume of an ink droplet comprises: calculating a first volume of a single ink droplet based on a mass and a density of an ink droplet; calibrating a measurement parameter used in an optical measurement approach based on the first volume; and acquiring a second volume of a single ink droplet using the optical measurement approach based on the calibrated measurement parameter.

16 Claims, 4 Drawing Sheets

(51) Int. Cl.
  *G01F 22/00*  (2006.01)
  *G01F 25/00*  (2006.01)

(56) References Cited

U.S. PATENT DOCUMENTS

| | | |
|---|---|---|
| 2006/0279590 A1 | 12/2006 | Buehler et al. |
| 2006/0279602 A1 | 12/2006 | Dijksman et al. |
| 2008/0278534 A1 | 11/2008 | Kim et al. |
| 2011/0045167 A1 | 2/2011 | Ikushima |
| 2011/0121021 A1 | 5/2011 | Dudenhoefer et al. |
| 2012/0296581 A1 | 11/2012 | Zhou et al. |
| 2012/0327145 A1 | 12/2012 | Pouzet |

FOREIGN PATENT DOCUMENTS

| | | |
|---|---|---|
| CN | 100339221 C | 9/2007 |
| CN | 101301814 A | 11/2008 |
| CN | 101952049 A | 1/2011 |
| CN | 102770274 A | 11/2012 |
| CN | 103915578 A | 7/2014 |
| CN | 105459601 A | 4/2016 |
| JP | 2005-121401 A | 5/2005 |
| JP | 2006-341608 A | 12/2006 |
| JP | 2015-125125 A | 7/2015 |
| TW | 201006678 A1 | 2/2010 |

OTHER PUBLICATIONS

Office Action dated Oct. 19, 2016 issued in corresponding Chinese Application No. 201610029198.5.
Office Action dated Mar. 1, 2017 issued in corresponding Chinese Application No. 201610029198.5.

US 10,576,738 B2

CALIBRATION METHOD AND CALIBRATION DEVICE FOR VOLUME OF INK DROPLET, PRINTING APPARATUS

This is a National Phase Application filed under 35 U.S.C. 371 as a national stage of PCT/CN2016/098155, filed Sep. 6, 2016, an application claiming the benefit of Chinese Application No. 201610029198.5, filed Jan. 15, 2016, the content of each of which is hereby incorporated by reference in its entirety.

TECHNICAL FIELD

The present disclosure belongs to the field of display technology, and in particular relates to a calibration method and a calibration device for a volume of an ink droplet, and a printing apparatus including the calibration device.

BACKGROUND

In the inkjet printing technology, ink droplets are printed into pixels by a printing injection head. Using the inkjet printing technology to fabricate OLED display products has advantages such as high material utilization, short fabrication time and the like. Thus, employing the inkjet printing technology to fabricate OLED display products has gained a broad attention, and has become a focus of development. Fabricating OLED display products utilizing the inkjet printing technology requires relatively high accuracy of a printing position and relatively high accuracy of an ink droplet volume. If the accuracy of a printing position is not high enough, then an ink droplet cannot enter a pixel; if the precision of an ink droplet volume is not high enough, then a case of non-uniform display arises. Therefore, for the performance of a fabricated product, it is crucial to precisely measure a volume of an ink droplet.

Existing inkjet printing apparatus typically employs an optical measurement approach to measure a volume of an ink droplet. A single ink droplet can be precisely measured using the optical measurement approach, with a short measurement time. The optical measurement approach forms an optical image of an ink droplet, and then performs a fitting process on the image to calculate a volume of the ink droplet. Thus, the optical measurement approach has a relatively large error.

FIG. 1 is a schematic diagram in which an ink droplet is being measured using the optical measurement approach in the prior art, and FIG. 2 is an enlarged view of part A in FIG. 1.

Referring to FIGS. 1 and 2, a part A is a boundary profile of an ink droplet 104, and a part B is a center position of the ink droplet 104. There are two types of errors produced by the optical measurement approach: one is a type of error caused by a resolving power of an optical lens; and the other is a type of error resulting from an estimation of the center position. Furthermore, there is also a problem of difficulty in finding optimal measurement parameters in the optical measurement approach, which may also lead to a measurement error. In addition, different types of ink droplets have different refractive index for light, which also causes measurement error.

SUMMARY

In order to address the above-described problems, the present disclosure provides a calibration method and a calibration device for a volume of an ink droplet and a printing apparatus including the calibration device, configured to eliminate or reduce an error in the optical measurement approach, to increase a precision of a volume of an ink droplet.

According to an aspect of the present disclosure, there is provided a calibration method for a volume of an ink droplet, comprising: calculating a first volume of a single ink droplet based on a mass and a density of an ink droplet; calibrating measurement parameters used in an optical measurement approach based on the first volume; and acquiring a second volume of a single ink droplet using the optical measurement approach based on the calibrated measurement parameters. The optical measurement approach acquires a volume of a single ink droplet by performing a fitting process on an optical image of the ink droplet.

According to an embodiment of the present disclosure, the method may further include, before the step of calculating a first volume of a single ink droplet: acquiring a total mass of a plurality of ink droplets; acquiring a quantity of the plurality of ink droplets; and acquiring a density of the ink droplets.

According to an embodiment of the present disclosure, the step of calculating a first volume of a single ink droplet may comprise: calculating a total volume of the plurality of ink droplets based on the total mass and the density of the plurality of ink droplets; and calculating the first volume based on the total volume and the quantity of the plurality of ink droplets.

According to an embodiment of the present disclosure, the step of acquiring a total mass of a plurality of ink droplets may comprise: accommodating a plurality of ink droplets dropping from nozzles; and measuring a total mass of the plurality of ink droplets.

According to an embodiment of the present disclosure, the step of acquiring a quantity of the plurality of ink droplets may comprise: recording a first time when the ink droplets start dropping; recording a second time when the ink droplets stop dropping; and calculating a quantity of the plurality of ink droplets based on a time difference between the second and first time and a preset dropping frequency. The dropping frequency is a quantity of ink droplets dropping from the nozzles per unit time.

According to an embodiment of the present disclosure, the measurement parameter used in an optical measurement approach may comprise: parameters for processing a boundary of an optical image of an ink droplet; and parameters for processing a center of an optical image of an ink droplet.

According to an embodiment of the present disclosure, the step of acquiring a second volume of a single ink droplet using the optical measurement approach based on the calibrated measurement parameters may comprise: acquiring a radius of an ink droplet based on the calibrated measurement parameters; and calculating the second volume of a single ink droplet based on the radius.

According to an embodiment of the present disclosure, the step of acquiring a radius of an ink droplet based on the calibrated measurement parameters may comprise: acquiring a boundary profile of an optical image of an ink droplet based on the calibrated parameters for processing a boundary of an optical image of an ink droplet; acquiring a center point of an optical image of an ink droplet based on the calibrated parameters for processing a center of an optical image of an ink droplet; and acquiring a radius of an ink droplet based on the boundary profile and the center point.

According to an embodiment of the present disclosure, the calibration method for a volume of an ink droplet may be applied to inkjet printing for manufacturing an OLED display device.

According to another aspect of the present disclosure, there is provided a calibration device for a volume of an ink droplet, comprising: a calculation unit, for calculating a first volume of a single ink droplet based on a mass and a density of an ink droplet; a calibration unit, for calibrating measurement parameters used in an optical measurement approach based on the first volume; and a first acquisition unit, for acquiring a second volume of a single ink droplet using the optical measurement approach based on the calibrated measurement parameters. The optical measurement approach acquires a volume of a single ink droplet by performing a fitting process on an optical image of the ink droplet.

According to an embodiment of the present disclosure, the calibration device may further comprise: a second acquisition unit, for acquiring a total mass of a plurality of ink droplets, a quantity of the plurality of ink droplets, and a density of the ink droplets.

According to an embodiment of the present disclosure, the calculation unit may calculate a total volume of the plurality of ink droplets based on the total mass and the density of the plurality of ink droplets, and may calculate the first volume based on the total volume and the quantity of the plurality of ink droplets.

According to an embodiment of the present disclosure, the second acquisition unit may comprise: an accommodator, for accommodating a plurality of ink droplets dropping from nozzles; and a weigher, for measuring a total mass of the plurality of ink droplets.

According to an embodiment of the present disclosure, the second acquisition unit may comprise: a recording module, for recording a first time when the ink droplets start dropping, and a second time when the ink droplets stop dropping; and a counting module, for calculating a quantity of the plurality of ink droplets based on a time difference between the second and first time instants and a preset dropping frequency. The dropping frequency is a quantity of ink droplets dropping from the nozzles per unit time.

According to an embodiment of the present disclosure, the measurement parameters used in an optical measurement approach may comprise: parameters for processing a boundary of an optical image of an ink droplet; and parameters for processing a center of an optical image of an ink droplet.

According to an embodiment of the present disclosure, the first acquisition unit may comprise: a radius acquisition module, for acquiring a radius of an ink droplet based on the calibrated measurement parameters; and a volume calculation module, for calculating the second volume of a single ink droplet based on the radius.

According to an embodiment of the present disclosure, the radius acquisition module may comprise: a first submodule, for acquiring a boundary profile of an optical image of an ink droplet based on the calibrated parameters for processing a boundary of an optical image of an ink droplet; a second submodule, for acquiring a center point of an optical image of an ink droplet based on the calibrated parameters for processing a center of an optical image of an ink droplet; and a third submodule, for acquiring a radius of an ink droplet based on the boundary profile and the center point.

According to an embodiment of the present disclosure, there is provided a printing apparatus, comprising the calibration device for a volume of an ink droplet according to the present disclosure.

The calibration method and the calibration device for a volume of an ink droplet according to the present disclosure can calibrate a measurement parameters used in an optical measurement approach by an accurately calculated first volume of a single ink droplet, so as to acquire a second volume of a single ink droplet based on the calibrated measurement parameters, to eliminate or reduce error in the optical measurement approach and increase a precision of a volume of an ink droplet.

BRIEF DESCRIPTION OF THE FIGURES

The accompanying drawings, which constitute a part of the specification, are provided for further understanding of the present disclosure, and for explaining the present disclosure along with the following specific implementations, but not intended to limit the present disclosure, in which.

DETAILED DESCRIPTION

In order to provide a better understanding of the technical solutions of the present disclosure to those skilled in the art, the calibration method and the calibration device for a volume of an ink droplet and the printing apparatus including the calibration device according to embodiments of the present disclosure are described in further detail below in conjunction with the drawings.

Figure 1:
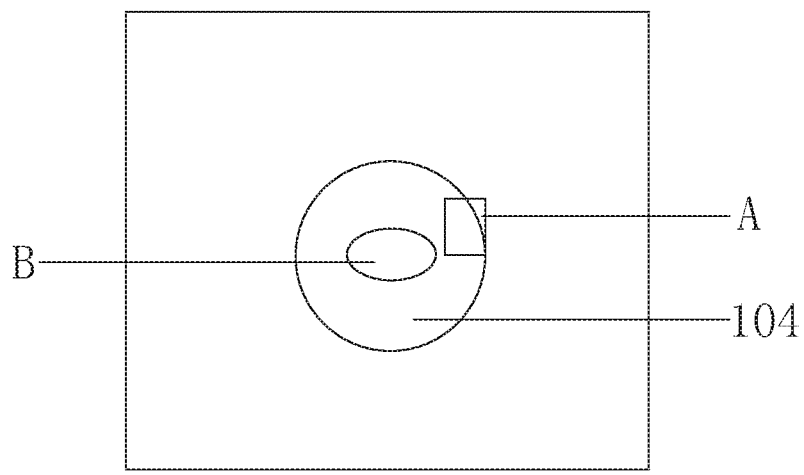
FIG. 1 is a schematic diagram in which an ink droplet is being measured using the optical measurement approach in the prior art.
Figure 2:
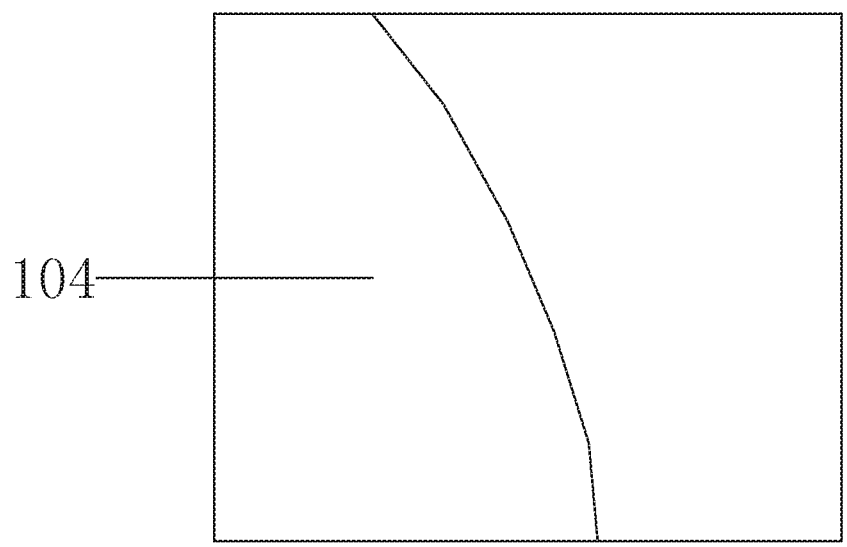
FIG. 2 is an enlarged view of part A in FIG. 1.
Figure 3:
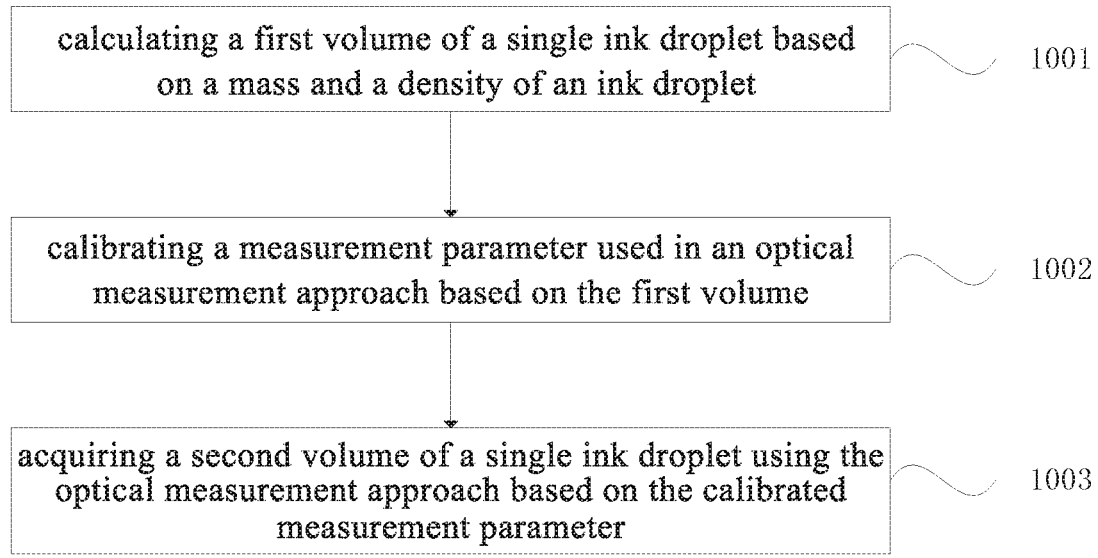
FIG. 3 is a flow chart of the calibration method for a volume of an ink droplet according to an embodiment of the present disclosure.

FIG. 3 is a flow chart of the calibration method for a volume of an ink droplet according to an embodiment of the present disclosure.

Referring to FIG. 3, the calibration method for a volume of an ink droplet according to an embodiment of the present disclosure may include:

Step 1001: calculating a first volume of a single ink droplet based on a mass and a density of an ink droplet;

Step 1002: calibrating measurement parameters used in an optical measurement approach based on the first volume; and Step 1003: acquiring a second volume of a single ink droplet using the optical measurement approach based on the calibrated measurement parameters.

According to an embodiment of the present disclosure, before the step of calculating a first volume of a single ink droplet, the method may further include: acquiring a total mass of a plurality of ink droplets; acquiring a quantity of the plurality of ink droplets; and acquiring a density of the ink droplets. In this case, the step of calculating the first volume of a single ink droplet (step 1001) may include: calculating a total volume of the plurality of ink droplets based on the total mass and the density of the plurality of ink droplets; and calculating the first volume based on the total volume and the quantity of the plurality of ink droplets. For example, in a case where the total mass of the plurality of ink droplets with the quantity of N is M, and the density of the ink droplets is ρ, the total volume of the N ink droplets can be calculated as V=M/ρ, and then the first volume v of the single ink droplet is calculated as v=V/N. In addition, the accuracy of the first volume obtained can be improved by averaging multiple measurements. The density ρ of the ink droplets may be provided by the supplier, or the density ρ of the ink droplets obtained in advance may be measured.

According to an embodiment of the present disclosure, the step of acquiring the total mass of the plurality of ink droplets may include: holding a plurality of ink droplets dripped from the nozzle; and measuring a total mass of the plurality of ink droplets. Further, the step of acquiring the quantity of the plurality of ink droplets may include: recording a first time at which the nozzles starts to drop ink droplets; recording a second time at which the nozzles ends to drop ink droplets; and calculating the quantity of the plurality of ink droplets according to a time difference between the second time and the first time and a preset frequency of dripping. The frequency of dropping is a quantity of ink droplets dripping from the nozzle per unit time. For example, a first time T1 is recorded when the nozzles starts to drop ink droplets into an accommodator (105 in FIG. 5), and a second time T2 is recorded when the dropping stops, then a total mass M of the ink droplets in the accommodator is measured using a weigher (106 in FIG. 5), and a quantity N=F(T2−T1) of the dropped ink droplets is calculated, where F is a frequency of the dropping. The frequency of the dropping F may be in a range of 0-12000.

According to an embodiment of the present disclosure, the parameter used in the optical measurement approach may include parameters for processing a boundary of an optical image of an ink droplet and parameters for processing a center of an optical image of an ink droplet. In this case, the acquiring a second volume of a single ink droplet using the optical measurement approach based on the calibrated measurement parameters (step 1003) may include: acquiring a radius of the ink droplet based on the calibrated measurement parameters; and calculating the second volume of the ink droplet based on the radius. Specifically, a boundary profile of an optical image of an ink droplet may be acquired based on the calibrated parameters for processing a boundary of an optical image of an ink droplet; a center point of an optical image of an ink droplet may be acquired based on the calibrated parameters for processing a center of an optical image of an ink droplet; and a radius of the ink droplet may be acquired based on the boundary profile and the center point. An ink droplet may be assumed as equivalent to a sphere, thereby a volume of the ink droplet can be calculated using the acquired radius of the ink droplet.

The calibration method for a volume of an ink droplet according to an embodiment of the present disclosure can calibrate measurement parameters used in the optical measurement approach through a first volume obtained by weighing measurement, such that a more accurate boundary profile and center point may be obtained through the optical measurement approach, that is, a more accurate radius of an equivalent sphere may be obtained, so as to calculate a more accurate volume of a single ink droplet. The calibration method fir a volume of an ink droplet according to an embodiment of the present disclosure, may provide different measurement parameters for different types of ink droplets, such that the goal of precise measurement of a volume of an ink droplet can be reached.

The calibration method for a volume of an ink droplet according to an embodiment of the present disclosure, combines a weighing measurement and an optical measurement with each other, to calibrate measurement parameters used in the optical measurement approach based on a result of the weighing measurement, thereby increasing a measurement precision of the optical measurement approach.

Figure 4:
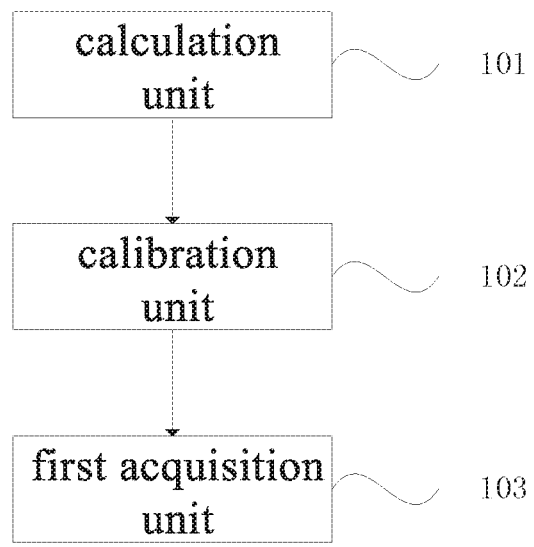
FIG. 4 is a schematic structural view of the calibration device for a volume of an ink droplet according to an embodiment of the present disclosure.

FIG. 4 is a schematic structural view of the calibration device for a volume of an ink droplet according to an embodiment of the present disclosure.

As shown in FIG. 4, the calibration device for a volume of an ink droplet according to an embodiment of the present disclosure may include a calculation unit 101, a calibration unit 102 and a first acquisition unit 103, to perform the steps 1001 to 1003 as shown in FIG. 3, respectively. The calculation unit 101 is configured to calculate a first volume of a single ink droplet based on a mass and a density of an ink droplet. The calibration unit 102 is configured to calibrate measurement parameters used in the optical measurement approach based on the first volume. The first acquisition unit 103 is configured to acquire a second volume of a single ink droplet using the optical measurement approach based on the calibrated measurement parameters.

The calibration device for a volume of an ink droplet according to an embodiment of the present disclosure may further include a second acquisition unit fir acquiring a total mass of a plurality of ink droplets, a quantity of the plurality of ink droplets and a density of the ink droplets. In this case, the calculation unit 101 may calculate a total volume of the plurality of ink droplets based on the total mass and the density of the plurality of ink droplets, and may calculate the first volume based on the total volume and the quantity of the plurality of ink droplets.

According to an embodiment of the present disclosure, the second acquisition unit includes an accommodator and a weigher (which will be described later in detail with reference to FIGS. 5 to 7). The accommodator is configured to accommodate a plurality of ink droplets dropped from the nozzles. The weigher is configured to measure a total mass of a plurality of ink droplets.

According to an embodiment of the present disclosure, the second acquisition unit includes a recording module and a counting module. The recording module is configured to record a first time when the ink droplets start dropping and a second time when the ink droplets stop dropping. The counting module is configured to calculate a quantity of the plurality of ink droplets based on a time difference between the second and first time and a preset dropping frequency. The dropping frequency refers to a quantity of ink droplets dropping from the nozzles per unit time.

Figure 5:
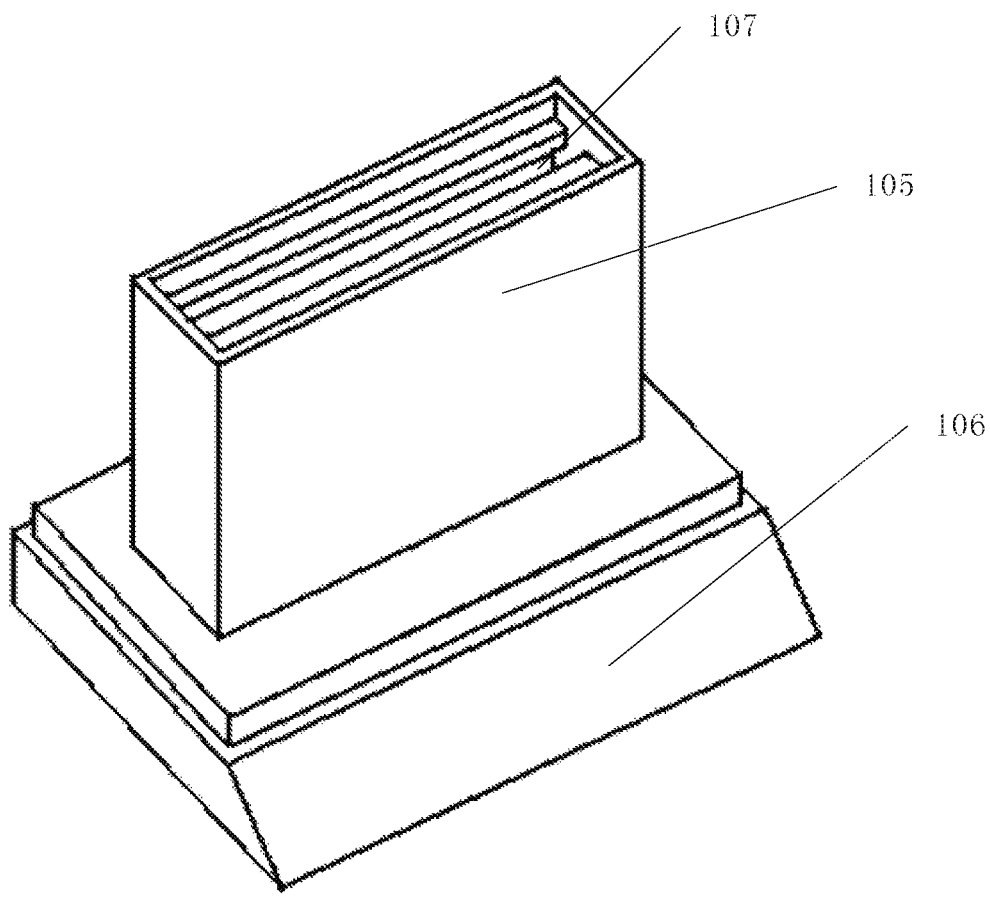
FIG. 5 is a schematic perspective view of an accommodator and a weigher for the calibration device for a volume of an ink droplet according to an embodiment of the present disclosure.
Figure 6:
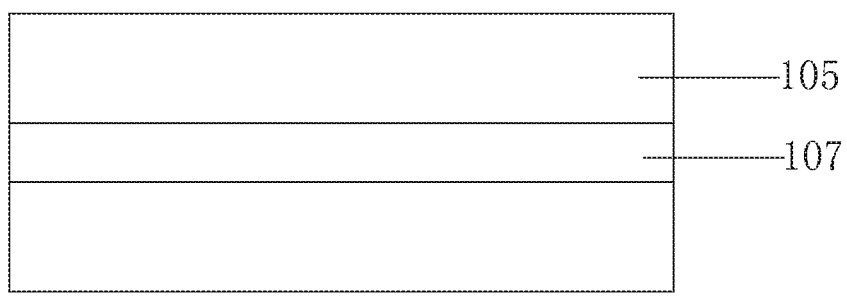
FIG. 6 is a schematic plan view of the accommodator shown in FIG. 5.
Figure 7:
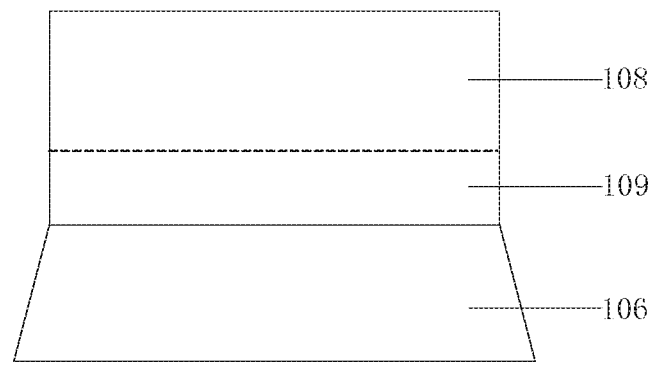
FIG. 7 is a schematic front view of the accommodator and the weigher shown in FIG. 5.

FIG. 5 is a schematic perspective view of an accommodator and a weigher for the calibration device for a volume of an ink droplet of an embodiment of the present disclosure, FIG. 6 is a schematic plan view of the accommodator shown in FIG. 5, and FIG. 7 is a schematic front view of the accommodator and the weigher shown in FIG. 5.

As shown in FIGS. 5 to 7, an accommodator 105 may include an upper portion 108 and a lower portion 109. In the lower portion 109, nonvolatile liquid such as silicone oil is pre-stored, such that ink droplets do not easily volatilize after dropping into the accommodator 105. The weigher 106 may employ a balance with high precision.

A butt joint 107 corresponding to the injection head may be provided at an opening of the accommodator 105, to ensure all the ink droplets can be dropped into the accommodator 105, thereby further reducing volatilization of ink droplets during the dropping. A plurality of nozzles may be provided on the injection head, the nozzles being controlled by a control program to start dropping ink droplets and to end dropping ink droplets.

According to an embodiment of the present disclosure, the first acquisition unit 103 may include a radius acquisition module and a volume calculation module. The radius acquisition module is configured to acquire a radius of an ink droplet based on the calibrated measurement parameters. The volume calculation module is configured to calculate a second volume of a single ink droplet based on the radius. The radius acquisition module may include first to third submodules. The first submodule is configured to acquire a boundary profile of an optical image of an ink droplet based on the calibrated parameters for processing a boundary of an optical image of an ink droplet. The second submodule is configured to acquire a center point of an optical image of an ink droplet based on the calibrated parameters for processing a center of an optical image of an ink droplet. The third submodule is configured to acquire a radius of an ink droplet based on the boundary profile and the center point.

The calibration device for a volume of an ink droplet according to an embodiment of the present disclosure can calibrate measurement parameters used in the optical measurement approach through a first volume obtained by weighing measurement, such that a more accurate boundary profile and center point may be obtained through the optical measurement approach, that is, a more accurate radius of an equivalent sphere may be obtained, so as to calculate a volume of a single ink droplet. accurately The calibration device for a volume of an ink droplet according to an embodiment of the present disclosure, may provide different measurement parameters for different types of ink droplets, such that the goal of precise measurement of a volume of an ink droplet can be reached.

The calibration device for a volume of an ink droplet according to an embodiment of the present disclosure, combining a weighing measurement and an optical measurement with each other, to calibrate measurement parameters used in the optical measurement approach based on a weighing measurement result, thereby increasing a measurement precision of the optical measurement approach.

The calibration device for a volume of an ink droplet according to an embodiment of the present disclosure may be applied to various printing apparatus, in particular, may be applied to manufacture of an inkjet printing apparatus of an (MED display device.

It can be understood that the foregoing implementations are merely exemplary implementations used for describing the principle of the present disclosure, but the present disclosure is not limited thereto. Those of ordinary skill in the art may make various variations and modifications without departing from the spirit and essence of the present disclosure, and these variations and modifications shall fall into the protection scope of the present disclosure.

The invention claimed is:

1. A calibration method for a volume of an ink droplet, comprising:
    acquiring a total mass of a plurality of ink droplets;
    acquiring a quantity of the plurality of ink droplets;
    acquiring a density of the ink droplets;
    calculating a first volume of a single ink droplet based on a mass and a density of an ink droplet;
    calibrating measurement parameters used in an optical measurement approach based on the first volume; and
    acquiring a second volume of a single ink droplet using the optical measurement approach based on the calibrated measurement parameters,
    wherein the optical measurement approach acquires a volume of a single ink droplet by performing a fitting process on an optical image of the ink droplet,
    wherein the step of acquiring a quantity of the plurality of ink droplets comprises:
    recording a first time when the ink droplets stall dropping;
    recording a second time when the ink droplets stop dropping; and
    calculating a quantity of the plurality of ink droplets based on a time difference between the second and first time and a preset dropping frequency,
    wherein the dropping frequency is a quantity of ink droplets dropping from the nozzles per unit time.

2. The calibration method for a volume of an ink droplet according to claim 1, wherein the step of calculating a first volume of a single ink droplet comprises:
    calculating a total volume of the plurality of ink droplets based on the total mass and the density of the plurality of ink droplets; and
    calculating the first volume based on the total volume and the quantity of the plurality of ink droplets.

3. The calibration method for a volume of an ink droplet according to claim 1, wherein the step of acquiring a total mass of a plurality of ink droplets comprises:
    accommodating a plurality of ink droplets dropping from nozzles; and
    measuring a total mass of the plurality of ink droplets.

4. The calibration method for a volume of an ink droplet according to claim 1, wherein the measurement parameters used in an optical measurement approach comprise:
    parameters for processing a boundary of an optical image of an ink droplet; and
    parameters for processing a center of an optical image of an ink droplet.

5. The calibration method for a volume of an ink droplet according to claim 4, wherein the step of acquiring a second volume of a single ink droplet using the optical measurement approach based on the calibrated measurement parameter comprises:
    acquiring a radius of an ink droplet based on the calibrated measurement parameters; and
    calculating the second volume of a single ink droplet based on the radius.

6. The calibration method for a volume of an ink droplet according to claim 5, wherein the step of acquiring a radius of an ink droplet based on the calibrated measurement parameters comprises:
    acquiring a boundary profile of an optical image of an ink droplet based on the calibrated parameters for processing a boundary of an optical image of an ink droplet;
    acquiring a center point of an optical image of an ink droplet based on the calibrated parameters for processing a center of an optical image of an ink droplet; and
    acquiring a radius of an ink droplet based on the boundary profile and the center point.

7. An inkjet printing manufacturing method for OLED display device, comprising calibrating a volume of an ink droplet according to the method of claim 1.

8. A calibration device for a volume of an ink droplet, comprising:
    a calculation unit, for calculating a first volume of a single ink droplet based on a mass and a density of an ink droplet;

a calibration unit, for calibrating measurement parameters used in an optical measurement approach based on the first volume; and a first acquisition unit, for acquiring a second volume of a single ink droplet using the optical measurement approach based on the calibrated measurement parameters, a second acquisition unit, for acquiring a total mass of a plurality of ink droplets, a quantity of the plurality of ink droplets, and a density of the ink droplets, wherein the optical measurement approach acquires a volume of a single ink droplet by performing a fitting process on an optical image of the ink droplet, wherein the second acquisition unit comprises:

a recording module, for recording a first time when the ink droplets start dropping, and a second time when the ink droplets stop dropping; and a counting module, for calculating a quantity of the plurality of ink droplets based on a time difference between the second and first time instants and a preset dropping frequency, wherein the dropping frequency is a quantity of ink droplets dropping from the nozzles per unit time.

9. The calibration device for a volume of an ink droplet according to claim 8, wherein the calculation unit calculates a total volume of the plurality of ink droplets based on the total mass and the density of the plurality of ink droplets, and calculates the first volume based on the total volume and the quantity of the plurality of ink droplets.

10. The calibration device for a volume of an ink droplet according to claim 8, wherein the second acquisition unit comprises:

an accommodator, for accommodating a plurality of ink droplets dropping from nozzles; and a weigher, for measuring a total mass of the plurality of ink droplets.

11. The calibration device for a volume of an ink droplet according to claim 8, wherein the measurement parameters used in an optical measurement approach comprises:

parameters for processing a boundary of an optical image of an ink droplet; and parameters for processing a center of an optical image of an ink droplet.

12. The calibration device for a volume of an ink droplet according to claim 11, wherein the first acquisition unit comprises:

a radius acquisition module, for acquiring a radius of an ink droplet based on the calibrated measurement parameters; and a volume calculation module, for calculating the second volume of a single ink droplet based on the radius.

13. The calibration device for a volume of an ink droplet according to claim 12, wherein the radius acquisition module comprises:

a first submodule, for acquiring a boundary profile of an optical image of an ink droplet based on the calibrated parameters for processing a boundary of an optical image of an ink droplet;

a second submodule, for acquiring a center point of an optical image of an ink droplet based on the calibrated parameters for processing a center of an optical image of an ink droplet; and a third submodule, for acquiring a radius of an ink droplet based on the boundary profile and the center point.

14. A printing apparatus, comprising the calibration device for a volume of an ink droplet according to claim 8.

15. The printing apparatus according to claim 14, wherein the calibration device further comprises:

a second acquisition unit, for acquiring a total mass of a plurality of ink droplets, a quantity of the plurality of ink droplets, and a density of the ink droplets.

16. The printing apparatus according to claim 15, wherein the calculation unit of the calibration device calculates a total volume of the plurality of ink droplets based on the total mass and the density of the plurality of ink droplets, and calculates the first volume based on the total volume and the quantity of the plurality of ink droplets.

* * * * *